United States Patent [19]

Carlson

[11] Patent Number: 4,790,636
[45] Date of Patent: Dec. 13, 1988

[54] METHOD OF FORMING A COUNTER ELECTRODE FOR AN ELECTROCHROMIC OPTICAL SHUTTER

[75] Inventor: Robert L. Carlson, Southgate, Mich.

[73] Assignee: Ford Motor Company, Dearborn, Mich.

[21] Appl. No.: 943,233

[22] Filed: Dec. 18, 1986

[51] Int. Cl.⁴ ............................................. G02F 1/01
[52] U.S. Cl. .................................................... 350/357
[58] Field of Search ..................... 350/357; 252/408.1, 252/600

[56] References Cited

U.S. PATENT DOCUMENTS

| | | | |
|---|---|---|---|
| 4,181,406 | 1/1980 | Kohara et al. | 350/357 |
| 4,365,010 | 12/1982 | Bard et al. | 350/357 X |
| 4,482,216 | 11/1984 | Hashimoto et al. | 350/357 |
| 4,571,350 | 2/1986 | Parker et al. | 427/109 |

OTHER PUBLICATIONS

Lampert, L. M., T. R. Omstead and P. C. Yu, "Chemical and Optical Properties of Electrochromic Nickel Oxide Films", Presented at SPIE's, 29th Annual International Technical Symposium on Optical and Electro—Optical Engineering, San Diego, CA, 18-23, Aug. 1985.

Primary Examiner—Eugene R. Laroche
Assistant Examiner—Nathan W. McCutcheon
Attorney, Agent, or Firm—William E. Johnson; Clifford L. Sadler

[57] ABSTRACT

This specification is directed to electrochromic optical shutter (10) in which an electrochromic material (12), an ion conductor (14), and a counter electrode (16), in that order, are sandwiched between visibly transparent electrodes (18-18). The shutter is improved by forming the counter electrode from a nickel oxide applied to, as a base therefor, either the ion conductor or one of the transparent electrodes. The material is applied by a pyrolytic spray process in which a solution containing nickel as a pyrolyzable organic salt dissolved in an organic medium is sprayed on the base. The base has been previously heated to a temperature sufficient to pyrolyze the sprayed material and form a nickel oxide counter electrode layer.

2 Claims, 1 Drawing Sheet

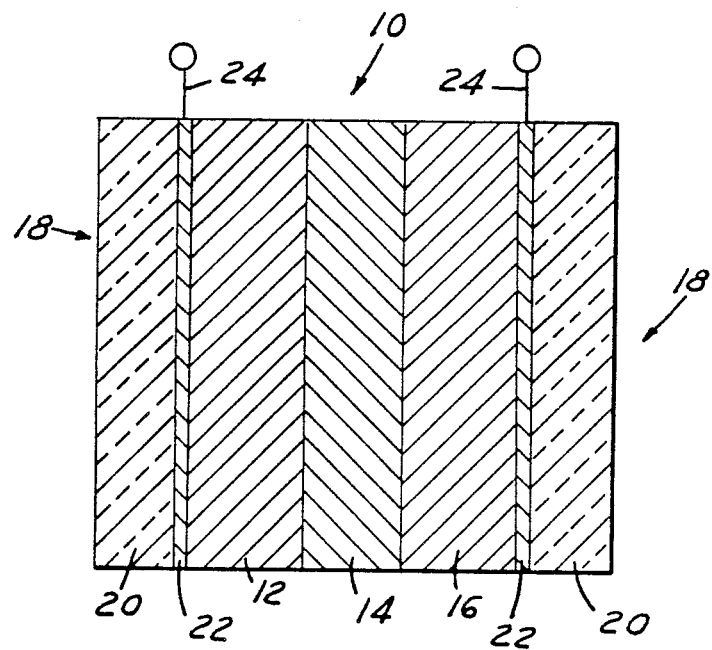

METHOD OF FORMING A COUNTER ELECTRODE FOR AN ELECTROCHROMIC OPTICAL SHUTTER

TECHNICAL FIELD

Electrochromic optical shutters are devices which may be electrically switched from a transparent state to a nontransparent state. In other words, depending upon the state of charge in the electrochromic optical shutter, one may either view something through it or one may not view something through it. The change is brought about by changing the polarity of an applied electric field (or voltage).

BACKGROUND AND PRIOR ART STATEMENT

Electrochromic optical shutters are an emerging technology in the motor vehicle field as well as commercial glass field. This technology can be used to form so-called "privacy" glass windows for motor vehicles. In one state of electrical charge, the electrochromic optical shutter would be transparent or bleached and people within the vehicle can look at what is outside. Also, people on the outside of the vehicle may view the interior of the vehicle. When the electrochromic optical shutter is switched to its colored state, the people within the vehicle cannot view anything through the colored electrochromic optical shutter nor may the people within the vehicle be viewed by those outside the vehicle through such a colored electrochromic optical shutter.

Ford Motor Company is attempting to develop this type of electrochromic optical shutter for use in vehicles such as small and large vans, recreational 4-wheel drive vehicles and, as well as, commercial and residential window glass, for improving building energy efficiency. I have been recently working on electrochromic optical shutters attempting to develop them for use in such vehicles.

No search was conducted on the subject matter of this application in the U.S. Patent Office or in any other search facility. I am unaware of any prior art more relevant than that set forth in an article presented at SPIE 29th Annual International Technical Symposium, on Optical and Electro-Optical Engineering, in San Diego, Calif. during 1985. The paper is entitled "Chemical and Optical Properties of Electrochromic Nickel Oxide Films."

DISCLOSURE OF THE INVENTION

This invention relates to an improvement in an electrochromic optical shutter and, more particularly, is directed an improvement in an electrochromic optical shutter in which an electrochromic material, an iron conductor, and a counter-electrode, in that order, are sandwiched between visibly transparent electrodes.

In accordance with the teachings of my invention, the improved electrochromic optical shutter is one wherein the counter electrode is formed of a pyrolytically applied nickel oxide. This nickel oxide is applied to, as a base therefor, either the ion conductor or one of the transparent electrodes by a pyrolytic spray process. In the pyrolytic spray process, a solution containing nickel as a pyrolyzable organic salt dissolved in an organic medium is sprayed on the base. The base is heated to a temperature sufficient to pyrolyze the sprayed material to thereby form a nickel oxide counter electrode. It is, of course, apparent that the base must be heated prior to the application of the pyrolyzable organic salt dissolved in the organic medium.

BRIEF DESCRIPTION OF THE DRAWING

The novel features that are considered characteristic of the invention are set forth with particularity in the appended claims. The invention itself, however, both as to its organization and its method of operation, together with additional objects and advantages thereof, will best be understood from the following description of a specific embodiment when read in conjunction with the accompanying drawing which is a schematic representation of an electrochromic optical shutter in accordance with the teachings of my invention.

BEST MODE AND INDUSTRIAL APPLICABILITY

The following description is what I now consider to be a preferred embodiment of the electrochromic optical shutter of my inventive construction. The following description also sets forth what I now contemplate to be the best mode of construction of my inventive electrochromic optical shutter. The description is not intended to be a limitation upon the broader principles of this construction, and while preferred material are used to form the construction in accordance with the requirements of the law, it does not mean that other materials cannot be used to make this construction in areas where criticality of the material has not been specified.

The property of electrochromism is very important to the development of large area optical shutters which may be used as information displays or as windows for motor vehicles. The switching speed is not a key consideration. From a building energy efficiency viewpoint in regard to using electrochromic glazings, the ability to dynamically control incoming solar radiation either in the visible or near infrared spectral regions is very attractive. As mentioned above, electrochromism also has an important future in automotive glazings.

Electrochromism is known to occur in several transition metal oxides. The characteristics of electrochromism are manifest by a reversible color change, usually switching from an uncolored state to a colored state, or vice versa, as the result of an applied electric current. Electrochromic materials exhibit both chemical and optical changes by dual ion and electron ejection or injection. As a result, color centers are formed in the material that produce optical adsorption in the visible wavelength region. Also, in certain cases, large changes in electrical conductivity can occur, causing significant infrared reflectivity switching effects. Coloration of an electrochromic material can occur on either the cathodic or anodic cycle. For nickel oxide, coloration occurs by chemical oxidation during anodization. A very important property of electrochromic films is that they exhibit mixed conductivity, both electronic and ionic, in which ions can be rapidly and reversibly inserted in step with injected or ejected electrons.

In the previously cited SPIE paper a report is made that nickel oxide deposited by electrochemical deposition and by anodization of nickel electrodes is electrochromic. I have found that if nickel oxide is deposited by a pyrolytic process, it is current switchable but not physically electrochromic (can't see any physical change). Thus, this form of nickel oxide may be used as an excellent counter electrode as it is transparent under all operating conditions but electrically and ionically conductive. Also, since it is pyrolytically deposited, it is very stable and durable in comparison with other deposition techniques, and thickness can be easily controlled for optimum performance.

There is shown in the FIGURE, an electrochromic optical shutter, generally identified by the numeral 10. In accordance with the teachings of a preferred embodiment, the shutter has an electrochromic material 12. In accordance with the preferred embodiment, the electrochromic material is electrochemically deposited nickel oxide. The next layer is an ion conductor 14. The ion conductor 14 will be described in greater detail hereinbelow. The next layer is a counter electrode 16. This counter electrode is formed of nickel oxide, pyrolytically applied. The reason it is pyrolytically applied is that this form of nickel oxide, for some reason or other, is not visibly or physically electrochromic as is nickel oxide which has been applied by electrochemical deposition or by anodization of nickel electrodes. By using such a counter electrode, there is a greater ability for storing ions necessary for the electrochromic switching of the electrochromic material. Thus, by having this storage capacity, it is easier to switch the electrochromic material 12 when so desired.

The ion conductor 14 is applied to, as a base therefor, either the electrochromic material 12 or the counter electrode 16 in the preferred embodiment by a pyrolytic spray process. In the pyrolytic spray process, a solution containing lithium and aluminum as pyrolyzable organic salts in an organic medium are sprayed on the heated base. The base has been previously heated to a temperature sufficient to pyrolyze the sprayed material and to form a lithium-doped, aluminum oxide ion conducting layer 14. A suitable solution for pyrolytic spray is one which contains 157 grams of methylene chloride, 97 grams methanol, 3 grams lithium acetyl acetonate (AcAc), and 12 grams aluminum AcAc. The base material is preheated to a temperature of 1100° F. prior to the spraying operation.

The counter electrode 16 is applied to, as a base therefor, either the ion conductor 14 or one of the transparent electrodes, generally identified by the numeral 18, in the preferred embodiment by a pyrolytic spray process. In the pyrolytic spray process, a solution containing nickel as a pyrolyzable organic salt in an organic medium is sprayed on the heated base. The base has been previously heated to a temperature sufficient to pyrolyze the sprayed material and to form a nickel oxide counter electrode 16. A suitable solution for pyrolytic spray is one which contains 150 ml of methylene chloride, 100 ml methanol, 4 grams nickel acetyl acetonate. The base material is preheated to a temperature of 1100° F. prior to the spraying operation.

Visibly transparent electrodes, previously identified by the numerals 18—18, are placed on either side of the sandwiched elements. These visibly transparent electrodes are formed from a glass sheet 20 having a conductive tin oxide coating 22 thereon. Suitable electric leads 24 extend from the conductive tin oxide coatings 22—22 so that reversible current supply may be directed to the electrochromic optical shutter 10.

An operation of the electrochromic optical shutter of my invention occurs when electrons are driven from left to right as viewed in the drawing and ions move from right to left. As a result of this action, the electrochromic material is darkened. Reverse operation, of course, lightens the material and makes it transparent. The particular improvement of my invention is the use of pyrolytically applied nickel oxide as the counter electrode of the electrochromic optical shutter.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. A method of forming a counter electrode for an electrochromic optical shutter in which an electrochromic material, an ion conductor, and said counter electrode are sandwiched between electrodes, which comprises the step of:

applying said counter electrode to, as a base therefor, either said ion conductor or one of said electrodes in a pyrolytic spray process in which a solution containing nickel as pyrolyzable organic salt dissolved in an organic medium is sprayed on said base heated to a temperature sufficient to pyrolyze said spray material and form a nickel oxide counter electrode which is transparent and not electrochromic.

2. The method of claim 1 wherein: said base is heated to a temperature of about 1100° F.

* * * * *